United States Patent [19]
Yamashita

[11] Patent Number: 6,165,245
[45] Date of Patent: *Dec. 26, 2000

[54] FOLIAR FERTILIZER AND METHOD FOR USING THE SAME

[76] Inventor: Thomas T. Yamashita, 3631 Bogue Rd., Denair, Calif. 95316-9619

[ * ] Notice: This patent issued on a continued prosecution application filed under 37 CFR 1.53(d), and is subject to the twenty year patent term provisions of 35 U.S.C. 154(a)(2).

[21] Appl. No.: 09/149,930

[22] Filed: Sep. 9, 1998

[51] Int. Cl.[7] ........................................................ C05F 5/00
[52] U.S. Cl. .......................... 71/26; 71/11; 71/27; 71/64.1
[58] Field of Search ............................... 71/64.1, 26, 11, 71/23, 24; 210/610, 611

[56] References Cited

U.S. PATENT DOCUMENTS

| | | | |
|---|---|---|---|
| 4,351,735 | 9/1982 | Buddemeyer et al. | 252/1 |
| 4,383,845 | 5/1983 | Rutherford | 71/16 |
| 4,473,648 | 9/1984 | Tang | 435/240 |
| 4,652,294 | 3/1987 | Arnold | 71/28 |
| 4,952,229 | 8/1990 | Muir | 71/7 |
| 5,549,729 | 8/1996 | Yamashita | 71/26 |
| 5,582,627 | 12/1996 | Yamashita | 71/26 |
| 5,696,094 | 12/1997 | Yamashita | 514/22 |
| 5,797,976 | 8/1998 | Yamashita | 71/26 |

FOREIGN PATENT DOCUMENTS

| | | | |
|---|---|---|---|
| 161395 A2 | 11/1985 | European Pat. Off. . | |
| 43-022206 | 9/1968 | Japan . | |
| 2279578 | 11/1990 | Japan | C05G 1/00 |

OTHER PUBLICATIONS

Castro et al., "Effects of foliar nutrient sprays on Phaseolus vulgaris L. cultivars", Anais da Escola Superior de Agricultura, pp. 109–118, 1983.

Khater et al., "Effects of foliar spray of thiamin, vitamin B1 on vegetative growth and volatile oil of Tagetes minutra L", Annals of Agricultural Science, pp. 1883–1888, 1992.

Alexander, A., "Optimum Timing Of Foliar Nutrient Sprays," *Schering AG Agrochemical Div. Special Fertilizers Düsseldorf*, West Germany, pp. 44–60.

Berrie, Alex M.M., "The Effect Of Sucrose Sprays On The Growth Of Tomato," *Physiologia Plantarum* (1960) vol. 13:9–19.

Brasher, E.P., et al., "Foliar Nutrition Sprays On Vegetable Crops," *University Of Delaware Agricultural Experiment Station Newark*, Delaware (Apr., 1953) Bulletin No. 295:1–18.

Klinker, J. Edward, "Effect Of Foliar Applications Of Urea, Sucrose, and Dextrose On Tomato Yields and Quality," *Kentucky Agricultural Experiment Station University Of Kentucky* (Apr. 1953) Bulletin 595:1–29.

Kovacs, G., "The Importance Of Environmental, Plant And Spray Characteristics For A Foliar Nutrition Program To Be Successful," *Plant Protection And Agrochemistry Centre*, Budapest, Hungary pp. 26–43.

Mederski, H.J., et al., "Foliar Fertilization Of Field Crops," *Ohio Agricultural Experiment Station*, Ohio p. 56 and pp. 3–12.

Müller, K., "The Effect Of Foliar Fertilization On The Yield And Quality Of Different Crops," *Institute Of Agricultural Chemistry*, University Of Göttingen, Göttingen, West–Germany pp. 434–451.

Went, F.W., et al., "Growth Response Of Tomato Plants To Applied Sucrose[1]," *American Journal Of Botany* (Feb. 1948) vol. 33, No. (2):95–106.

*Primary Examiner*—Gary P. Straub
*Attorney, Agent, or Firm*—Bret E. Field; Bozicevic, Field & Francais LLP

[57] ABSTRACT

Foliar fertilizer compositions and methods for their use are provided. The subject compositions are aqueous solutions of at least one coenzyme, where the coenzyme(s) is preferably a vitamin B, and more preferably folic acid and/or pyridoxine, where in many preferred embodiments the compositions include both folic acid and pyridoxine. The subject compositions may further include at least one of a carbohydrate source, a complexing agent and a preservative. The subject foliar fertilizer compositions find use in enhancing the growth of a variety of plants through foliar application.

15 Claims, No Drawings

FOLIAR FERTILIZER AND METHOD FOR USING THE SAME

TECHNICAL FIELD

The field of this invention is fertilizers.

BACKGROUND OF THE INVENTION

Fertilizers are materials that are used to supply elements needed for plant nutrition. Fertilizer materials may be in the form of solids, semi-solids, slurry suspensions, pure liquids, aqueous solutions and gases. Fertilizing materials may be introduced into a plant's environment in a number of different ways, including through addition to the soil, through application directly to a plant's foliage, and the like. The use of fertilizers is critical to commercial agriculture as fertilizers are essential to correct natural deficiencies and/or replace components in soil.

In many instances, it is beneficial to apply a fertilizer directly to the foliage of a plant, i.e. to use a foliar fertilizer. Such instances include situations where a given soil has characteristics such that the transport properties of nutrients through the soil are poor. In such instances, the use of a foliar fertilizing composition overcomes the soil disadvantages.

As such, a number of different foliar fertilizer compositions have been developed and/or used with a variety of different types of crops.

Despite the number of different foliar fertilizers that have been developed, there is a continued need to develop new compositions. Of particular interest would be the development of fertilizer compositions that include a minimum of different components, preferably naturally occurring components, where such compositions nonetheless provide for significant enhancement in plant growth.

Relevant Literature

U.S. Patents of interest include: U.S. Pat. Nos. 4,473,648; 4,652,294; 4,952,229; 5,549,729; 5,582,627 and 5,696,094. Also of interest are JP 68-022206 and EP 161395.

References of interest include: Berrie, "The Effect of Sucrose Sprays on the Growth of Tomato," Physiologia Plantarum (1960) 13: 9–19; Brasher et al., "Foliar Nutrition Sprays on Vegetable Crops" Bullentin No. 295, (April 1953)(University of Delaware, Newark Del.); Klinker et al., "Effect of Foliar Applications of Urea, Sucrose, and Dextrose on Tomato Yield and Quality," Bulletin 595 (April 1953)(Kentucky Agricultural Experiment Station) (University of Kentucky); Mederski et al., "Foliar Fertilization of Plant Crops," Research Circulation (1956) Ohio Agricultural Experimentation Station; and Went et al., "Growth Response to Tomato Plants of Applied Sucrose," American J. Botany (1948) 35: 93–106.

SUMMARY OF THE INVENTION

Foliar fertilizing compositions and methods for their use are provided. The subject compositions are aqueous solutions that include at least one coenzyme, where the coenzyme(s) is preferably a vitamin B, and more preferably at least one of, and in many embodiments both of, folic acid (vitamin Bc) and pyridoxine (vitamin $B_6$). The subject fertilizing compositions may further include at least one of a carbohydrate source, a complexing agent and a preservative. The subject compositions find use in methods of enhancing plant growth through foliar application.

DESCRIPTION OF THE SPECIFIC EMBODIMENTS

Methods and compositions for enhancing plant growth are provided. The subject compositions are aqueous solutions of at least one coenzyme, where the coenzyme(s) is preferably a vitamin B, and more preferably at least one of, and many cases both of, folic acid and pyridoxine. The subject compositions may also include one or more of the following agents: (a) a carbohydrate source; (b) a complexing agent; and (c) a preservative. The subject compositions find use in methods of enhancing plant growth where the compositions are applied to the foliage of plants, i.e. the subject compositions find use as foliar fertilizers. In further describing the subject invention, the compositions will be described first followed by a discussion of methods for their use.

Before the subject invention is further described, it is to be understood that the invention is not limited to the particular embodiments of the invention described below, as variations of the particular embodiments may be made and still fall within the scope of the appended claims. It is also to be understood that the terminology employed is for the purpose of describing particular embodiments, and is not intended to be limiting. Instead, the scope of the present invention will be established by the appended claims.

In this specification and the appended claims, the singular forms "a," "an," and "the" include plural reference unless the context clearly dictates otherwise. Unless defined otherwise, all technical and scientific terms used herein have the same meaning as commonly understood to one of ordinary skill in the art to which this invention belongs.

The compositions used as foliar fertilizers in the subject methods are aqueous compositions that include at least one coenzyme. Coenzymes of interest include: biotin, vitamin B compounds, inositol, etc. In preferred embodiments, the coenzyme is a vitamin B. By vitamin B is meant a water soluble vitamin which is generally a member of the vitamin B complex. Specific vitamin B compounds of interest include: vitamin $B_1$ (thiamine); vitamin $B_1$ disulfide (thiamine disulfide); vitamin $B_1$ propyl disulfide (thiamine propyl disulfide; prosultiamine); vitamin $B_2$ (riboflavin); vitamin $B_2$ phosphate (riboflavin monophosphate); vitamin $B_3$ (nicotinamide, niacin, nicotinic acid); vitamin $B_4$ (adenine); vitamin $B_5$ (pantothenic acid); vitamin $B_6$ hydrochloride (pyridoxine hydrochloride); vitamin $B_{12}$ (cyanobolamin); vitamin $B_{12r}$ (vitamin $B_{12}$-Co(II)); vitamin $B_{12}$ coenzyme (cobamamide); vitamin $B_{12a}$; vitamin $B_{12b}$; vitamin $B_{12c}$; vitamin $B_{12d}$; vitamin $B_{12p}$; vitamin $B_{12s}$; vitamin $B_{13}$ (orotic acid); vitamin $B_x$ (p-aminobenzoic acid, PABA); and vitamin $B_c$ (folic acid).

While the foliar fertilizer composition may include one or more different vitamin B compounds, preferably the composition includes one or two different vitamin B compounds, where the vitamin B compounds are preferably folic acid and pyridoxine, where the foliar fertilizer composition may include just one of, or both of, folic acid and pyridoxine. The amount of each of these coenzymes will be effective to enhance the rate of growth of the plant to which the composition is applied.

In preferred embodiments in which folic acid and/or pyridoxine are the vitamin B compounds, the amount of folic acid (i.e. N-[4[[(2-Amino-1,4-dihydro-4-oxo-6-pteridinyl)methyl]amino]benzoyl]-L-glutamic acid, PGA, liver *Lactobacillus casei* factor; vitamin Bc; vitamin M, fols äure, cytofol; folacin, foldine, foliamin, foliacet, folipac, folettes, folsan, folvite, inafolic and millafol) will range from about 0.50 to 20, usually from about 0.50 to 10 and more usually from about 1.0 to 5.0 ppm w/w, where in many embodiments the preferred range in the composition that is applied to foliage is from about 1.0 to 3.0 ppm w/w, and more preferably from about 1.0 to 2.0 ppm. Generally, the amount of pyridoxine or vitamin $B_6$ (e.g. from pyridoxine hydrochloride, 5-hydroxy-6-methyl-3,4-pyridinedimethanol hydrochloride; pyridoxol hydrochloride, vitamin $B_6$ hydrochloride, pyridoxinium chloride, adermine, hydrochloride, bonasanit, hexabione hydrochloride, hexabetalin, hexavibex, pyridipea, pyridox, becilan, benadon, hexermin, campovitron 6, hexabion ) will range from about 0.50 to 20, usually from about 0.50 to 10 and more usually from about 1.0 to 5.0 ppm w/w, where in many embodiments the preferred range in the composition that is applied to foliage is from about 1.0 to 3.0 ppm w/w, and more preferably from about 1.0 to 2.0 ppm. As mentioned above, in many embodiments of the invention the foliar fertilizer composition includes both of the above coenzymes, where the amounts of each enzyme are the same as those described above, such that the total coenzyme amount (i.e. the amount of both of the above coenzymes together) in the composition ranges from about 1.0 to 40, usually from about 1.0 to 20 and more usually from about 2.0 to 10 ppm w/w, where in many embodiments the preferred range in the composition that is applied to foliage is from about 2.0 to 6.0 ppm w/w, and more preferably from about 2.0 to 4.0 ppm.

In addition to the above coenzymes, the foliar fertilizer composition may further include a carbohydrate source. Any convenient carbohydrate source may be employed, where suitable carbohydrates that may be present in the solution include: monosaccharides, including 4 carbon (e.g. erythrose, threose, erythrulose), 5 carbon (e.g. ribose, arabinose, xylose, lyxose, ribulose, xylulose) and 6 carbon (e.g. alfose, altrose, glucose, mannose, gulose, idose, galactose, talose, psicose, fructose, sorbose, tagatose) monosaccharides, as well as disaccharides thereof, e.g. sucrose, lactose, maltose etc., and derivatives thereof, e.g. mannitol, sorbitol etc.; where in many embodiments the carbohydrate will be one or more of a carbohydrate selected from the group consisting of glucose, fructose, sucrose, galactose, lactose, sorbitol, and mannitol. The total amount of carbohydrate in the foliar fertilizer composition, e.g. combined amount of the disparate types of carbohydrates present in the composition, will generally range from about 10,000 to 900,000, usually from about 10,000 to 850,000 and more usually from about 10,000 to 500,000 ppm w/w, where in many embodiments the amount will range form about 10,000 to 600,000 and more usually from about 50,000 to 250,000 ppm w/w.

The subject foliar compositions may further include one or more complexing agents, where by "complexing agent" is meant a chelating agent, i.e. an agent that is capable of complexing with a metal ion. Complexing agents of interest include: humic acid, fulvic acid, ulmic acid, citric acid, amino acids, nucleic acids, lignosulfonates, e.g. Ca—, K—, Na—, and ammonium lignosulfonates, EDTA, EDDA, EDDHA, HEDTA, CDTA, PTPA, NTA and the like. The total amount of complexing agent in the foliar fertilizer composition, e.g. combined amount of the disparate types of complexing agents present in the composition, will generally range from about 100 to 100,000, usually from about 100 to 75,000 and more usually from about 100 to 50,000 ppm w/w, where in many embodiments the amount will range form about 100 to 60,000 and more usually from about 1000 to 50,000 ppm w/w.

In addition to the above components, the foliar fertilizer composition may further include a preservative agent. While any convenient preservative agent may be employed, preservative agents of interest include: proprionic acid, acetic acid, potassium sorbate, tartaric acid, malic acid and the like, where the amount of preservative in the composition will typically range from about 100 to 20,000, usually from about 100 to 10,000 and more usually from about 100 to 5,000 ppm w/w.

The above foliar fertilizer compositions are prepared by combining water with the various agents under conditions sufficient to produce an aqueous solution containing the various agents. The water that is used to produce the subject compositions may be tap water obtained from any convenient water source, e.g. a municipal water district, where the water may be purified or otherwise treated, e.g. to remove certain undesirable agents that may be initially present therein. The various agents to be solubilized in the water to produce the foliar fertilizer composition may be obtained from any convenient source, e.g. commercial vendor. For example, the carbohydrate component may be derived from a commercially available carbohydrate source, such as high fructose corn syrup, etc.

In preparing the subject aqueous foliar fertilizer compositions, a concentrated or parent composition may first be produced, which parent composition or mix is then diluted with water, usually at least about 5 fold, more usually at least about 10 fold and often at least about 20 fold, in order to obtain the final composition that is suitable for foliar application. In such parent compositions or concentrates, the total coenzyme component will typically range from about 1 to 100, usually from about 1 to 50 and more usually from about 1 to 10 (to provide for a concentration ranging from about 0.5 to 20, usually 0.5 to 10 and more usually 1.0 to 5.0 ppm w/w upon dilution as described supra, page 4); the total carbohydrate source component will typically range from about 100,000 to 900,000, usually from about 100,000 to 700,000 and more usually from about 100,000 to 850,000 ; the total complexing agent component will typically range from about 100 to 100,000, usually from about 100 to 75,000 and more usually from about 100 to 50,000; while the total preservative component will typically range from about 100 to 20,000, usually from about 100 to 16,000 and more usually from about 100 to 5,000.

In practicing the subject methods, the foliar fertilizer composition is contacted with at least a portion of the foliage of the plant for which growth is to be enhanced. By contact is meant that the aqueous fertilizer composition is placed on the surface of the foliage of the plant(s) to be treated, where the term "foliage" is used broadly to encompass not only the leaves of the plant, but every other part of the plant that is not underground, i.e. below the soil surface, such that the term "foliage" includes leaves, stems, flowers, fruit, etc. Contact may be by any convenient methods, including spraying, applying etc.

The amount of aqueous composition that is used during any one application will vary greatly depending on the nature of the plant, the nature of the composition, the environmental conditions, etc. Where crops are treated with the subject compositions, the amount that is applied based on acreage is generally at least about 0.25 to 10 gal per acre, usually at least about 0.25 to 5 gal per acre, and more usually at least about 0.25 to 2.5 gal per acre, where the amount that is applied may be as high as 10 gal per acre or higher, but will usually not exceed about 5 gal per acre.

Depending on the nature of the plant, the nature of the composition, and the environmental conditions, as well as other factors, the foliar fertilizer composition may be applied more than once over a given period of time. As such, the fertilizer composition may be applied daily, weekly, every two weeks, monthly etc.

Where one starts with a parent mix or concentrate, as described above, the subject methods also include a dilution step, in which water is combined with the concentrate in order to reduce the amount of agent in the composition. This dilution step will comprise introducing a sufficient amount of water to the concentrate to obtain at least about a 5 fold dilution, usually at least about a 10 fold dilution, and in many instances at least about a 20 fold dilution.

The subject methods, i.e. foliar application of the aqueous composition, result in an enhancement of growth of the plant that is treated, as compared to a control. By enhancement of growth is meant that over a set period of time, the treated plant attains a higher total mass than the control. The amount of enhancement will typically be at least about 5%, usually at least about 10% and more usually at least about 25%, where in many embodiments the amount of enhancement may be 50% or greater. In many embodiments, the amount of enhancement will be at least about 100%.

A variety of different plants may be treated according to the subject methods, where such plants include both crop and ornamental plants. A representative list of plants that may be treated according to the subject invention is provided in Table 1, infra.

The following is offered by way of illustration and not by way of limitation.

EXPERIMENTAL

I. Folic Acid Composition

A 1 ppm folic acid aqueous solution (FA 1 ppm) was prepared by combining 1 mg folic acid with 1 L tap water (obtained from the laboratory tap, Tulock Calif. municipal water supply). Similarly, a 2 ppm folic acid aqueous solution (FA 2 ppm) was prepared by combining 2 mg (amount) folic acid with 1 L tap water.

Rutger's tomato seedlings were sprayed with either tap water, the 1 ppm folic acid composition or the 2 ppm folic acid composition at 14 day intervals for 2 months beginning at the $4^{th}$ leaf stage. 4 sprays were applied over the 2 month period. Plants were then cut at the soil line and air dried for 72 hours. The results are provided in Table 1 below. Weights of plants are expressed in grams.

TABLE 1

| Treatment | Replications | | | | | Total | Mean |
|---|---|---|---|---|---|---|---|
| | 1 | 2 | 3 | 4 | 5 | | |
| Control | 58 | 64 | 45 | 55 | 60 | 282 | 56a |
| FA 1 ppm | 71 | 74 | 69 | 79 | 75 | 368 | 74b |
| FA 2 ppm | 73 | 80 | 78 | 78 | 74 | 383 | 77b | ppm expressed as w/w. Mean separation via Duncan's MRT @ 5%.

II. Pyridoxine Composition

A 1 ppm pyridoxine solution (P 1 ppm) was prepared by combining 1 mg pyridoxine hydrochloride with 1 L tap water. Similarly, a 2 ppm pyridoxine aqueous solution (P 2 ppm) was prepared by combining 2 mg pyridoxine with 1 L tap water.

Rutger's tomato seedlings were sprayed with either tap water, the 1 ppm pyridoxine composition or the 2 ppm pyridoxine composition at 14 day intervals for 2 months beginning at the $4^{th}$ leaf stage. 4 sprays were applied over the 2 month period. The plants were then cut at the soil line and air dried for 72 hours. The results are provided in Table 2 below. Weights of plants are expressed in grams.

TABLE 2

| Treatment | Replications | | | | | Total | Mean |
|---|---|---|---|---|---|---|---|
| | 1 | 2 | 3 | 4 | 5 | | |
| Control | 54 | 58 | 62 | 51 | 59 | 284 | 57a |
| P 1 ppm | 73 | 74 | 71 | 67 | 65 | 350 | 70b |
| P 2 ppm | 77 | 73 | 78 | 70 | 68 | 366 | 73b | ppm expressed as w/w. Mean separation via Duncan's MRT @ 5%.

III. Composition Having Both Pyridoxine and Folic Acid.

An aqueous solution (FA& P@1) having 1 ppm folic acid and 1 ppm pyridoxine was prepared in a manner analogous to that described above. Similarly, an aqueous solution (FA&P@2) having 2 ppm folic acid and 2 ppm pyridoxine was prepared.

Rutger's tomato seedlings were sprayed with either tap water, the FA& P@1 composition or the FA& P@2 composition at 14 day intervals for 2 months beginning at the $4^{th}$ leaf stage. 4 sprays were applied over the 2 month period. The plants were then cut at the soil line and air dried for 72 hours. The results are provided in Table 3 below. Weights of plants are expressed in grams.

TABLE 3

| Treatment | Replications | | | | | Total | Mean |
|---|---|---|---|---|---|---|---|
| | 1 | 2 | 3 | 4 | 5 | | |
| Control | 55 | 60 | 50 | 53 | 58 | 276 | 55a |
| FA&P@1 | 81 | 85 | 77 | 89 | 92 | 424 | 85b |
| FA&P@2 | 90 | 92 | 86 | 95 | 89 | 452 | 90b | ppm expressed as w/w. Mean separation via Duncan's MRT @ 5%.

IV. Composition Having Both Pyridoxine and Folic Acid, a Carbohydrate, and a Complexing Agent.

An aqueous solution having 1 ppm folic acid, 1 ppm pyridoxine, 7,000 ppm sucrose, 100 ppm fulvic acid and 100 ppm citric acid was prepared as follows:

| Material | Source | Amount/L |
|---|---|---|
| Folic Acid | Pteroylglutamic Acid | 1 mg |
| Pyridoxine | Pyridoxine Hydrochloride | 1 mg |
| Sucrose | Table Sugar | 7 g |
| Fulvic Acid | 2% Fulvic Acid | 5 ml |
| Citric Acid | Citric Acid Monohydrate | 109 mg |

Rutger's tomato seedlings were sprayed with either tap water or the resultant fertilizer composition (fert.) at 14 day intervals for 2 months beginning at the $4^{th}$ leaf stage. 4 sprays were applied over the 2 month period. The plants were then cut at the soil line and air dried for 72 hours. The results are provided in Table 4 below. Weights of plants are expressed in grams

TABLE 4

| Treatment | Replications | | | | | Total | Mean |
|---|---|---|---|---|---|---|---|
| | 1 | 2 | 3 | 4 | 5 | | |
| Control | 53 | 62 | 55 | 61 | 63 | 294 | 59a |
| fert | 105 | 115 | 134 | 126 | 145 | 625 | 125b | ppm expressed as w/w. Mean separation via Duncan's MRT @ 5%.

TABLE 1

| VEGETABLE CROPS | FRUIT & NUT CROPS | | FIELD CROPS | MISCELLANEOUS CROPS |
|---|---|---|---|---|
| Artichoke | Pome | Apple | Alfalfa | Avocado |
| Asparagus | | Pear | Barley | Breadfruit |
| Balsam Pear | | Quince | Beans | Cashew |
| Beet | Stone: | Almond | Buckwheat | Date |
| Broccoli | | Apricot | Canola | Fig |
| Brussels Sprout | | Cherry | Corn | Maracuja |
| Cabbage | | Nectarine | Cotton | Olive |
| Cauliflower | | Peach | Crambe | |
| Celery | | Plum | Flax | |
| Chard | | Pluot | Millet | |
| Chayote | | Prune | Oats | |
| Chinese Cabbage | Nuts: | Black Walnuts | Peanuts | |
| Collards | | Brazil Nuts | Rapeweed | |
| Cowpeas | | Cashews | Red Clover | |
| Cucumber | | Coconuts | Rice | |
| Cucurbits (group) | | Filberts | Rye | |
| Eggplant | | Hazel Nuts | Safflower | |
| Endive | | Hickory Nuts | Sorghum | |
| Garlic | | Macadamia | Soybeans | |
| Gherkin | | Pecan | Sugar Beets | |
| Gourds | | Pistachio | Sugar Cane | |
| Kale | | Walnuts | Sunflower | |
| Kohlrabi | Misc Nuts.- | Acorns | Tobacco | |
| Leeks | | Beechnuts | Wheat | |
| Lettuce | | Chestnuts | Wild Rice | |
| Melons | | Hackberry | | |
| Mustards | | Locust Bean | | |
| Okra | | Oysternuts | | |
| Onions | | Peanuts | | |
| Parsley | | Pignolia | | |
| Peas | | Wingnut | | |
| Peppers | Citrus: | Grapefruit | | |
| Rhubarb | | Lemon | | |
| Scallions | | Lime | | |
| Shallots | | Orange | | |
| Spinach | | Pomelo | | |
| Squash | | Tangerine | | |
| Tomato | Small Fruit: | Blueberries | | |
| | | Brambles | | |
| | | Cranberries | | |
| | | Currants | | |
| | | Gooseberries | | |
| | | Grapes | | |
| | | Litchi | | |
| | | Mango | | |
| | | Papaya | | |
| | | Pineapple | | |
| | | Pomegranate | | |

| TURFGRASS | PERENNIAL ORNAMENTALS | | |
|---|---|---|---|
| African Bermudagrass | Acanthus | Dodecatheon | Nepeta |
| Annual Bluegrass | Achillea | Doronicum | Oenothera |
| Annual Ryegrass | Aconitum | Echinacea | Opuntia |
| Bahiagrass | Aegopodium | Echinops | Paeonia |
| Bermudagrass | Ajuga | Epimedium | Papaver |
| Blue Couchgrass | Alcea | Eremurus | Patrinia |
| Blue Grama | Alchemilla | Erigeron | Penstemon |
| Bradley Bluegrass | Allium | Eryngium | Perovskia |
| Bradley Bermudagrass | Amsonia | Erythronium | Phlox |
| Buffalograss | Anaphalis | Eupatorium | Physostegia |
| Centipedegrass | Anchusa | Euphorbia | Platycodon |
| Canada Bluegrasss | Anemone | Filipendula | Polemonium |
| Chewings Fescue | Anthemis | Fritillaria | Polygonatum |
| Colonial Bentgrass | Aquilegia | Gaillardia | Polygonum |
| Common Carpetgrass | Arabis | Galium | Potentilla |
| Common Timothy | Arenaria | Gaura | Primula |
| Creeping Bentgrass | Arisaema | Gentiana | Pulmonaria |
| Creeping Red Fescue | Armeria | Geranium | Ranunculus |
| Crested Wheatgrass | Artemisia | Geum | Rodgersia |
| Hard Fescue | Arum | Gillenia | Rudbeckia |
| Italian Ryegrass | Aruncus | Gladiolus | Ruta |
| Japanese Lawngrass | Asarum | Gypsophila | Salvia |
| Kentucky Bluegrass | Asclepias | Helenium | Santolina |
| Kikuyugrass | Aster | Helianthus | Saponaria |
| Magennis Bermudagrass | Astilbe | Heliopsis | Scabiosa |
| Manilagrass | Aubrieta | Helleborus | Sedum |

TABLE 1-continued

| | | | |
|---|---|---|---|
| Mascarenegrass | Aurinia | Hemerocallis | Senecio |
| Meadow Fescue | Babtisia | Hesperis | Sidalcea |
| Redtop | Begonia | Heuchera | Silene |
| Rough Bluegrass | Belamcanda | Heucherella | Sisrynchium |
| Saint Augustinegrass | Bergenia | Hibiscus | Smilacina |
| Saltwater Couch | Boltonia | Hosta | Solidago |
| Sheep Fescue | Brunnera, | Houttuynia | Stachys |
| Slender Creeping Red Fescue | Caltha | Iberis | Stokesia |
| Smooth Bromegrass | Campanula | Iris | Tanacetum |
| Tall Fescue | Catananche | Kniphofia | Thalictrum |
| Tropical Carpetgrass | Centaurea | Lamiastrum | Thermopsis |
| Turf Timothy | Centranthus | Lamium | Tiarella |
| Velvet Bentgrass | Cerastium | Lavandula | Tradescantia |
| Weeping Alkaligrass | Ceratostigma | Liatris | Tricyrtis |
| | Chelone | Ligularia | Trillium |
| | Chrysanthemum | Lilium | Trollius |
| | Chysopsis | Limonium | Tulipa |
| | Cimicifuga | Linum | Uvularia |
| | Clematis | Liriope | Verbascum |
| | Convallaria | Lobelia | Verbena |
| | Coreopsis | Lupinus | Ver6nica |
| | Crocosmia | Lychnis | Vinca |
| | Crocus | Lycoris | Viola |
| | Delphinium | Lysimachia | Yucca |
| | Dianthus | Lythrum | |
| | Dicentra | Maiva | |
| | Dictamnus | Mertensia | |
| | Digitalis | Monarda | |
| | Disporum | Narcissus | |

ORNAMENTAL TREES

| | | |
|---|---|---|
| Abies (Fir) | Eugenia (Surinam Cherry) | Podocarpus (Yew Pine) |
| Acacia | Fagus (Beech) | Populus (Poplar) |
| Acer (Maple) | Feijoa (P Guava) | Prosopis (Mesquite) |
| Acrocarpus (Pl Cedar) | Ficus (Fig) | Prunus |
| Aesculus (R Horsechestnut) | Frnklinia | Pseudotsuga (Douglas Fir) |
| Agathis (Kauri) | Fraxinus (Ash) | Pseudopanax |
| Agonis (Peppermint Tree) | Geijera (A Willow) | Pyrus (Pear) |
| Ailanthus (Tree-Of-Heaven) | Ginkgo | Quercus (Oak) |
| Albizia (Silk Tree) | Gleditsia (Honey Locust) | Quillaja (Soapbark Tree) |
| Alnus (Alder) | Grevillea (Silk Oak) | Rhamnus (Italian Buckthorn) |
| Amelanchier | Gymnocladus (K Coffee Tree) | Rhus (Sumac) |
| Angophora (Gum Myrtle) | Hakea (Sea Urchin) | Robinia (Locust) |
| Araucaria | Halesia (Snowdrop) | Salix (Willow) |
| Arbutus (Madrone) | Harpephyllum (Kaffir Plum) | Sambucus (Elderberry) |
| Bauhinia | Harpullia | Sapium (Chinese Tallow) |
| Betula (Birch) | Jacaranda | Sassafras |
| Bombax (Silk-Cotton Tree) | Ilex (Holly) | Sequoia (Redwood) |
| Brachychiton | Juniperus (Juniper) | Sciadopitys (Umbrella Tree) |
| Callistemon (Bottlebrush) | Koelreuteria | Schinus (Peppers) |
| Calocedrus (Incense Cedar) | Laburnum (G Chain Tree) | Sophora (Japanese Pagoda) |
| Calodendrum (Cape Chestnut) | Lagerstroemia (Crape Myrtle) | Sorbus (Mountain Ash) |
| Carpinus (E. Hornbeam) | Lagunaria (Primrose Tree) | Stenocarpus (Firewheel) |
| Carya (Pecan) | Lafix (Larch) | Stewartia |
| Cassia | Laurus (Sweet Bay) | Styrax (Japanese Snowbell) |
| Castanospermum | Leptospermum (Tea Tree) | Tabebuia |
| Casuarina (Beefwood) | Leucodendron (Silver Tree) | Talauma |
| Catalpa | Ligustrum (Glossy Privet) | Tamarix (Athel Tree) |
| Cedrela (Cigar Box Tree) | Liquidambar (A Sweet Gum) | Taxodium (Bald Cypress) |
| Cedrus (Cedar) | Liriodendron (Tulip Tree) | Thuja (Arborvitae) |
| Celtis (Hackberry) | Lyonothamnus | Tilia (Linden) |
| Ceratonia (Carob) | Magnolia | Tipuana (Tipu Tree) |
| Cercidiphyllum (Katsura) | Malus (Crabapple) | Tristania |
| Cercis (E. Redbud) | Maclura (Osage Orange) | Tsuga (Hemlock) |
| Chamaecyparis (F Cypress) | Markhamia | Ulmus (Elm) |
| Chilopsis (Desert Willow) | Maytenus (Mayten Tree) | Umbellularia (California Bay) |
| Chionanthus (Fringe Tree) | Melaleuca | Vitex (NZ Chaste Tree) |
| Chorisia (Floss-Silk Tree) | Melia (Chinaberry) | Zelkova (Sawleaf) |
| Cinnamomum (Camphor) | Metasequoia (Dawn Redwood) | Zizyphus (Chinese Jujube) |
| Cladrastis (Yellowwood) | Metrosideros | |
| Clethra (Lily-Of-The-Valley) | Michelia | |
| Comus (Dogwood) | Morus (White Mulberry) | |
| Corynocarpus (NZ Laurel) | Myoporum | |
| Cotinus (Smoke Tree) | Myrica (PW Myrtle) | |
| Crataegus (Hawthorn) | Nyssa (Black Tulepo) | |
| Cryptomeria (J Cedar) | Olea (Olive) | |
| Cunninghamia (China Fir) | Oxydendrum (Sorrel Tree) | |
| Cuponiopsis (Carrotwood) | Parkinsonia (Jerusalem Thorn) | |

TABLE 1-continued

| | |
|---|---|
| Cupressocyparis | Phellodendron (Amur Cork) |
| Cupressus (Cypress) | Phytolacca (Umbu) |
| Cydonia (Quince) | Picea (Spruce) |
| Dalbergia (Sissoo) | Pinus (Pine) |
| Elaeagnus (R Olive) | Pistacia (Pistachio) |
| Efiobotrya (Loquat) | Pittosporum |
| Erythrina (Coral Tree) | Platanus (Sycamore) |
| Eucalyptus | Platycladus (O Arborvitae) |

ORNAMENTAL HOUSEPLANTS

| | | | | | |
|---|---|---|---|---|---|
| Abutilon | Celosia | Echinocactus | Kohleria | Platycerium | Torenia |
| Acacia | Celsia | Echinocereus | Lachenalia | Pittosporum | Tradescantia |
| Acalypha | Cephalocereus | Echium | Lantana | Plectranthus | Trichocereus |
| Achimenes | Ceropegia | Epidendrum | Lapageria | Pleione | Tropaeolum |
| Adiantum | Cestrum | Epiphyllum | Leptospermum | Plumbago | Tulipa |
| Adromischus | Chamaecereus | Episcia | Leucadendron | Polianthes | Vallota |
| Aechmea | Chamaedorea | Erica | Lilium | Polypodium | Veltheimia |
| Aeoniumn | Chamaerops | Erythrina | Limonium | Primula | Venidoarctotis |
| Aeschynanthus | Chirita | Eucalyptus | Lippia | Prostanthera | Venidium |
| Agapanthus | Chlorophytum | Eucharis | Lycaste | Protea | Vinca |
| Agave | Chorizema | Eucomis | Malvaviscus | Punica | Vriesea |
| Aglaonema | Chrysanthemum | Eupatorium | Mammillaria | Rebutia | Vuylstekeara |
| Allamanda | Cineraria | Euphorbia | Mandevilla | Rechsteineria | Wilsonara |
| Aloe | Cissus | Exacum | Maranta | Reinwardtia | Zantedeschia |
| Alonsoa | Citrus | Fabiana | Martynia | Rhipsalidopsis | Zebrina |
| Amaryllis | Cleistocactus | Fatshedera | Maurandia | Rhododendron | Zephyranthes |
| Ananas | Clerodendrum | Fatsia | Maxillaria | Roicissus | |
| Anchusa | Clianthus | Faucaria | Medinilla | Ricinus | |
| Anthurium | Clivia | Ferocactus | Miltonia | Rochea | |
| Aphelandra | Cobaea | Ficus | Mitraria | Rondeletia | |
| Aporocactus | Coccoloba | Fittonia | Momordica | Ruellia | |
| Araucaria | Codiaeum | Freesia | Monstera | Saintpaulia | |
| Arctotis | Coelogyne | Fuchsia | Moraea | Salpiglossis | |
| Ardisia | Coleus | Gardenia | Musa | Salvinia | |
| Aristochia | Columnea | Gasteria | Mutisia | Sanchezia | |
| Arum | Cordyline | Geogenanthus | Narcissus | Sansevieria | |
| Asclepias | Coronilla | Gerbera | Neoregelia | Sarracenia | |
| Asparagus | Coryphantha | Gladioius | Nepenthes | Saxifraga | |
| Aspidistra | Crassula | Globba | Nephrolepis | Schizanthus | |
| Asplenium | Crinum | Gloriosa | Nerine | Schlumbergera | |
| Astrophytum | Crocus | Guzmania | Nerium | Scindapsus | |
| Asystasia | Crossandra | Gymno-calycium | Nidularium | Sedum | |
| Babiana | Cryptanthus | Gynura | Nopalxchia | Selaginella | |
| Begonia | Ctenanthe | Haemanthus | Nymphaea | Senecio | |
| Beloperone | Cunonia | Haworthia | Odontoglossum | Ssinningia | |
| Billbergia | Cuphea | Hedera | Odontonia | Smithiantha | |
| Blechnum | Cupressus | Hedychium | Ophiopogon | Solanum | |
| Bougainvil | Cycas | Heliocereus | Oplismenus | Sollya | |
| Bouvardia | Cyclamen | Heliotropium | Opuntia | Sonerila | |
| Brunfelsia | Cymbidium | Hibiscus | Ornithogalum | Sparmannia | |
| Byophyllum | Cyperus | Hippeastrum | Pachystachys | Sphathiphylium | |
| Caladium | Datura | Hoya | Pamianthe | Sphaeralcea | |
| Calandrinia | Dendrobium | Hyacinthus | Paphiopedilum | Stapelia | |
| Calathea | Dianella | Hydrangea | Parodia | Stephanotix | |
| Calceolaria | Dianthus | Hymonocallis | Passiflora | Strelitzia | |
| Callicarpa | Dicentra | Hypoestes | Pelargonium | Streptocarpus | |
| Callistemon | Dicksonia | Impatiens | Pellaea | Streptosolen | |
| Camelia | Dieffenbachia | Hypocyrta | Pellionia | Sstrobilanthes | |
| Campanula | Dionaea | Impatiens | Pentas | Tecomaria | |
| Canna | Dipladenia | Ipomoea | Peperomia | Telopea | |
| Cantua | Dizygotheca | Ixia | Peristrophe | Tetrastigma | |
| Capsicum | Dracaena | Jacobinia | Philesia | Thunbergia | |
| Caralluma | Drosera | Jasminurn | Philodendron | Tibouchina | |
| Casia | Eccremocarpus | Jovellana | Phoenix | Tigridia | |
| Cattleya | Echeveria | Kalanchoe | Pilea | Tillandsia | |

It is evident from the above results and discussion that useful fertilizer compositions capable of enhancing plant growth are provided. The subject fertilizer compositions are relatively simple formulations in that they include a minimum of agents, and are readily prepared. Despite their simplicity, the subject compositions provide for substantial plant growth enhancement.

All publications and patent applications cited in this specification are herein incorporated by reference as if each individual publication or patent application were specifically and individually indicated to be incorporated by reference. The citation of any publication is for its disclosure prior to the filing date and should not be construed as an admission that the present invention is not entitled to antedate such publication by virtue of prior invention.

Although the foregoing invention has been described in some detail by way of illustration and example for purposes of clarity of understanding, it is readily apparent to those of ordinary skill in the art in light of the teachings of this invention that certain changes and modifications may be made thereto without departing from the spirit or scope of the appended claims.

What is claimed is:

1. A method for enhancing plant growth in a crop, said method consisting of:
   applying to said crop at a rate of 0.25 to 10 gal/acre a fertilizing composition consisting of:
   (a) water;
   (b) folic acid;
   (c) pyridoxine; and
   (d) a carbohydrate source in an amount ranging from about 100,000 to 900,000 ppm w/w;
   which composition after dilution of at least 20-fold has a folic acid concentration in an amount ranging from about 0.5 to 20 ppm and pyridoxine in an amount ranging from about 0.5 to 20 ppm;
   said diltuted composition enhancing plant growth.

2. The method according to claim 1, wherein said carbohydrate source is a monosaccharide, disaccharide or derivative thereof.

3. The method according to claim 2, wherein said carbohydrate source is selected from the group consisting of glucose, fructose, sucrose, galactose, lactose, sorbitol, and mannitol.

4. The method according to claim 1, wherein said folic acid is present in said composition after dilution in an amount ranging from about 0.50 to 10 ppm w/w.

5. The method according to claim 1, wherein said pyridoxine is present in said composition after dilution in an amount ranging from about 0.50 to 10 ppm w/w.

6. A method for enhancing plant growth in a crop, said method consisting of:
   applying to said crop at a rate of 0.25 to 10 gal/acre a fertilizing composition consisting of:
   (a) water;
   (b) folic acid;
   (c) pyridoxine;
   (d) a carbohydrate source in an amount ranging from about 100,000 to 900,000 ppm w/w; and
   (e) a complexing agent
   which composition after dilution of at least 20-fold has a folic acid concentration in an amount ranging from about 0.5 to 20 ppm and pyridoxine in an amount ranging from about 0.5 to 20 ppm;
   said diltuted composition enhancing plant growth.

7. The method according to claim 6, wherein said carbohydrate source is a monosaccharide, disaccharide or derivative thereof.

8. The method according to claim 7, wherein said carbohydrate source is selected from the group consisting of glucose, fructose, sucrose, galactose, lactose, sorbitol, and mannitol.

9. The method according to claim 6, wherein said complexing agent is selected from the group consisting of: humic acid, fulvic acid, a lignosulfonate; and citric acid.

10. The method according to claim 6, wherein said folic acid is present in said composition after dilution in an amount ranging from about 0.50 to 10 ppm w/w.

11. The method according to claim 6, wherein said pyridoxine is present in said composition after dilution in an amount ranging from about 0.50 to 10 ppm w/w.

12. A method for enhancing plant growth in a crop, said method consisting of:
    applying to said crop at a rate of 0.25 to 10 gal/acre a fertilizing composition consisting of:
    (a) water;
    (b) folic acid;
    (c) pyridoxine;
    (d) a carbohydrate source, wherein said carbohydrate source is present in said composition in an amount ranging from about 100.000 to 900,000 ppm w/w; and
    (e) a complexing agent
    which composition after dilution of at least 20-fold has a folic acid concentration in an amount ranging from about 1.0 to 5.0 ppm and pyridoxine in an amount ranging from about 1.0 to 5.0 ppm;
    said diltuted composition enhancing plant growth.

13. The method according to claim 12, wherein said carbohydrate source is a monosaccharide, disaccharide or derivative thereof.

14. The method according to claim 13, wherein said carbohydrate source is selected from the group consisting of glucose, fructose, sucrose, galactose, lactose, sorbitol, and mannitol.

15. The method according to claim 12, wherein said complexing agent is selected from the group consisting of: humic acid, fulvic acid, a lignosulfonate; and citric acid.

* * * * *